Arthur K. Moulton
INVENTOR.
ATTORNEYS

Sept. 26, 1967      A. K. MOULTON      3,343,812
PROCESS AND APPARATUS FOR CONDITIONING MATERIALS
Filed Oct. 17, 1966      3 Sheets-Sheet 2
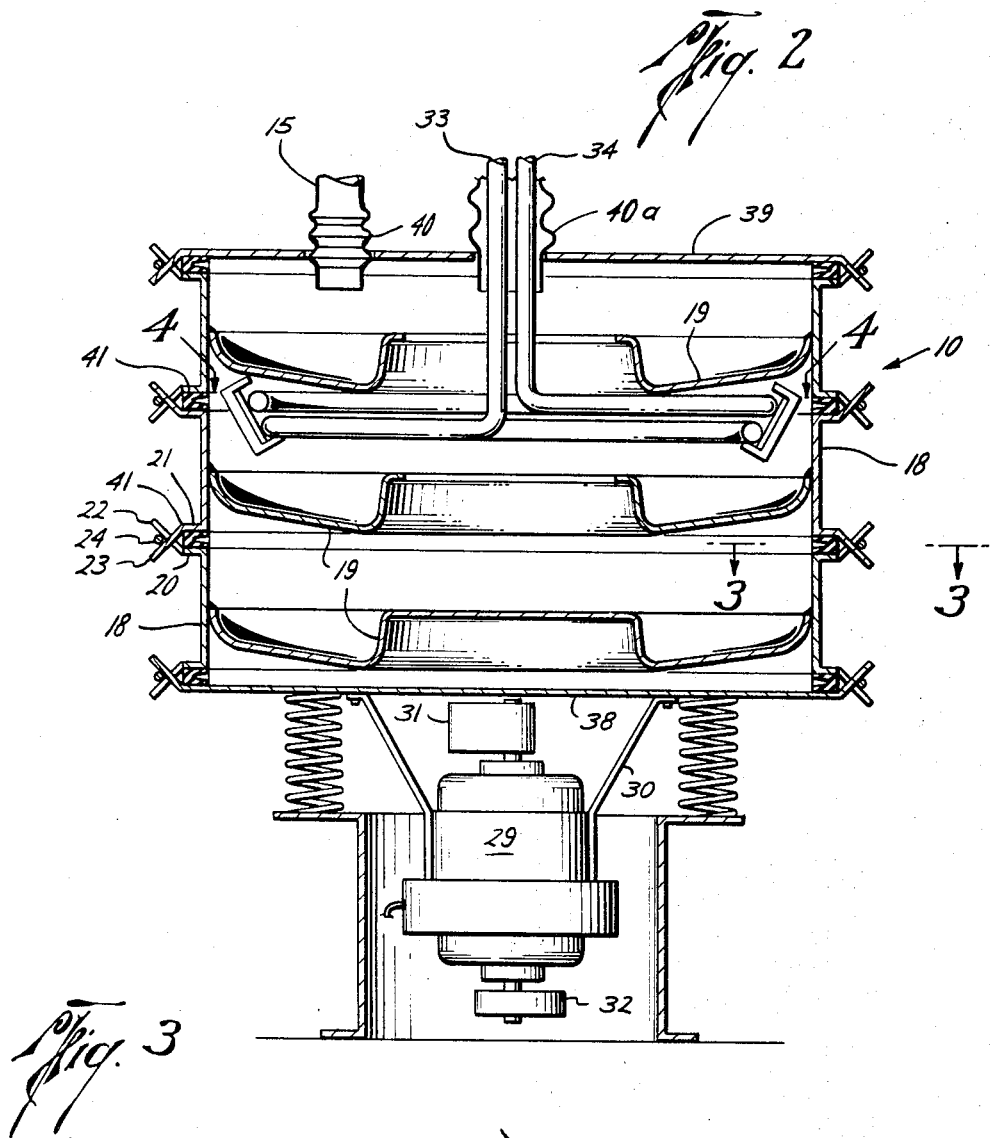
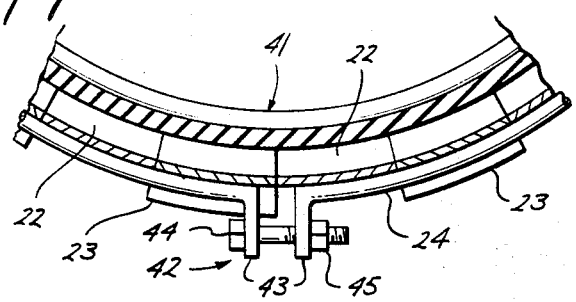
Arthur K. Moulton
INVENTOR.
BY Vincent Martin
Jo E. Edwards
M. H. Gay
ATTORNEYS

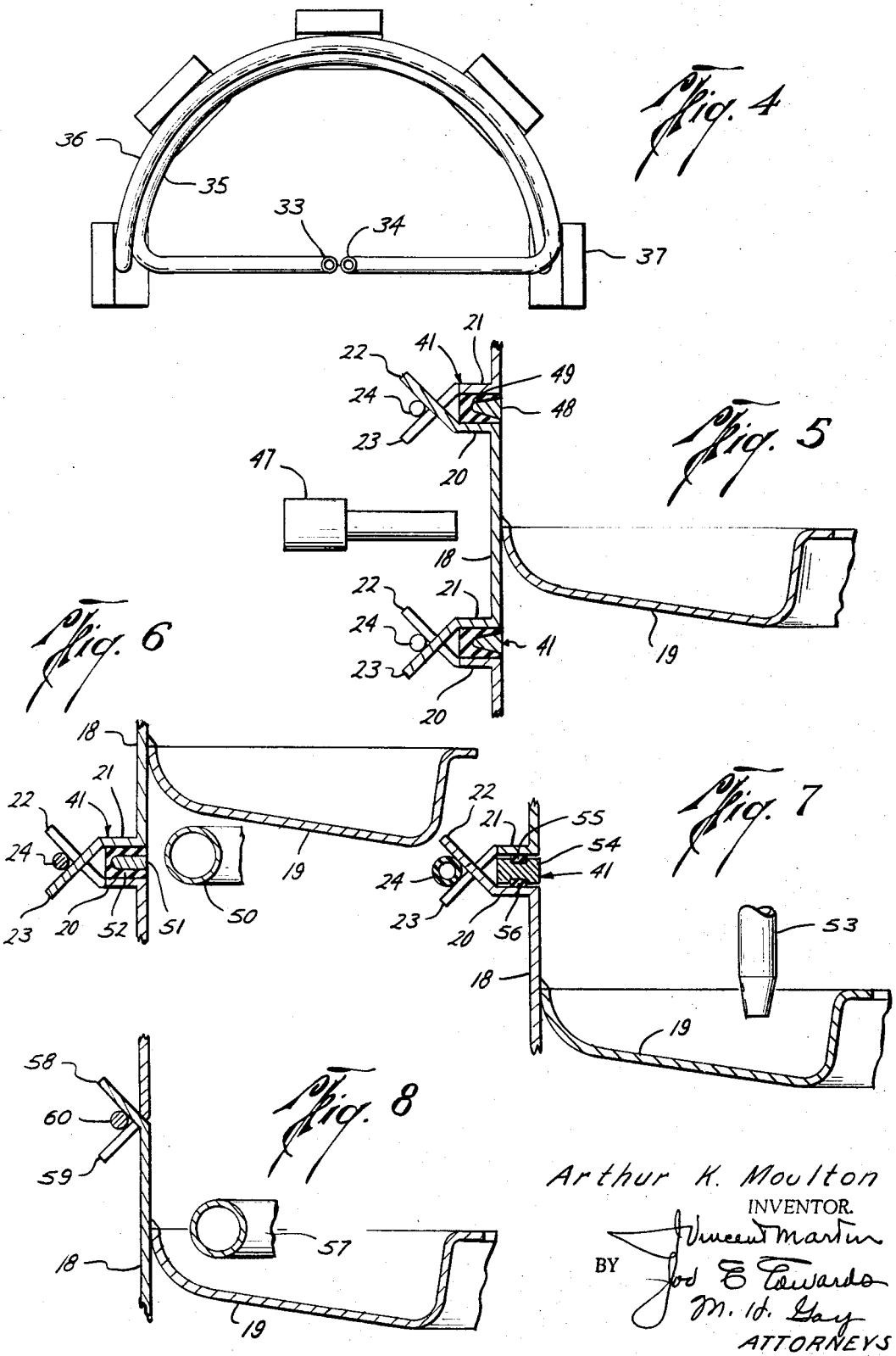

United States Patent Office 3,343,812
Patented Sept. 26, 1967

3,343,812
PROCESS AND APPARATUS FOR
CONDITIONING MATERIALS
Arthur K. Moulton, 7616-D Glen Prairie,
Houston, Tex. 77017
Filed Oct. 17, 1966, Ser. No. 594,642
15 Claims. (Cl. 259—2)

ABSTRACT OF THE DISCLOSURE

A process and apparatus for conditioning solids in which the solids are conditioned while being subjected to controlled vibrations, which vibrations fluidize the solids and move the solids through a conditioning zone. This abstract is neither intended to define the invention of the application which, of course, is measured by the claims, nor is it intended to be limiting as to the scope of the invention in any way.

---

The present application is a continuation-in-part application of my prior copending application Ser. No. 383,823, filed July 20, 1964, now abandoned.

The present invention relates to a process and an apparatus for continuous conditioning of solids. More specifically, the present invention relates to a process and apparatus for continuous conditioning of solids wherein said solids are in particulate form capable of being fluidized.

Prior to the present invention conditioning of solids has been accomplished by batch-type systems. In such batch-type systems solids may be readily and advantageously conditioned by fluidizing the solids during exposure to conditioning. Batch-type processing for conditioning solids has been conducted previously in vibratory devices and also in pneumatic devices. Such batch-type processing has the disadvantage of having to shut down to discharge the conditioned material from the system and charge the system with unconditioned material. An example of a vibrating batch-type treating system is disclosed in U.S. Patent No. 2,882,024, issued to H. Behrens et al. on Apr. 14, 1959. In such prior systems the time of exposure of the solids to the conditioning was determined by the cycle time of each batch. Extended exposure times without a commensurate increase in apparatus size greatly reduces the amount of solids that may be conditioned in the batch process. No provision can be made for conditioning under pressure in such systems. A continuous process for conditioning solids, particularly one in which the solids are fluidized and one having a high output for the equipment used, has long been needed.

An object of the present invention is to provide a process and an apparatus for continuously conditioning solids.

Another object of the present invention is to provide a process and apparatus for continuously conditioning solids wherein the solids are fluidized by controlled vibrations.

Another object of the present invention is to provide a continuous process and an apparatus for conditioning solids in which the solids are exposed to controlled vibrations which move the solids in a predetermined path through a conditioning zone and which vibrations further roll the solids whereby different portions of the solids are exposed to the conditioning.

Another object is to provide a continuous process and apparatus for conditioning solids in which the solids are exposed to controlled vibrations to move the solids downwardly through a series of horizontal arcuate paths with the length of travel of solids in each path being preselected to control the time of exposure of the solids to conditioning.

Another object of the present invention is to provide an apparatus for continuously conditioning solids in which the apparatus contains a conditioning zone and supplies controlled vibrations for movement of the solids in a defined path through the conditioning zone and further causes movement of the solids with respect to each other whereby each of the solid particles is exposed to the conditioning in the conditioning zone.

A further object of the present invention is to provide a continuous process and apparatus for conditioning solids utilizing controlled vibrations with conditioning pressures above atmospheric pressure.

Still another object of the present invention is to provide vibratory-type apparatus for continuously conditioning solids composed of a plurality of sections whereby the length of travel of solids through the apparatus may be varied by varying the number of sections used and further includes novel means for joining the sections together.

A still further object of the present invention is to provide an apparatus having a plurality of sections wherein solids are continuously conditioned with provision for the circulation of a conditioning medium into and from the sections.

The present invention is directed to a process and an apparatus for conditioning solids in which the solids are continually fed to the apparatus and are fluidized by controlled vibrations whereby the solids exposed to conditioning are kept in constant agitation or a fluidized state so that each solid particle will be conditioned and the length of travel through the conditioning zone may be lengthened or shortened to assure that each solid particle is conditioned to the desired degree.

Conditioning of solids as contemplated by the present invention includes the conditioning of the total solid feed to the device or it may also include the use of solids to assist in the conditioning of other solids. For example, salt, spices and other solids may be used to assist in the cooking of food products in the process and apparatus of the present invention wherein the salt, spices and other solids are not conditioned but rather act as a conditioning medium in cooperation with the conditioning means (heat for cooking) which is supplied to the process to achieve the desired conditioned product, i.e., cooked and seasoned food.

The controlled vibrations which are used in the present invention control the travel of the solids through the device and also impart the fluidizing action to the solids whereby they are constantly in motion with respect to each other in a rolling and random motion. By this motion the solids are all exposed to the conditioning.

Examples illustrative of the types of conditioning of solids to which the present invention may apply are as follows: thermal treatment (heating or cooling) for cooking or cooling foods, calcining of ores, regenerating chemicals by burning organic matter, dehydrating materials such as grains and desiccants; chemical treatment for application of a liquid to solids; and physical treatment for pelletizing pulverulent solids by agglomeration on drops of liquids, mixing of solids and coating of solids.

The above-mentioned objects and other objects and advantages of the present invention are illustrated in the accompanying drawings wherein:

FIGURE 2 is a vertical cross-sectional view of another form of the apparatus of the present invention which may be operated under pressure;

FIGURE 3 is a partial sectional view taken along lines 3—3 in FIGURE 2;

FIGURE 4 is a partial sectional view of the piping used in the present invention taken along lines 4—4 in FIGURE 2;

FIGURE 5 is a partial vertical cross-sectional view illustrating a form of the present invention with externally located conditioning means;

FIGURE 6 is another partial vertical cross-sectional view similar to FIGURE 5 and illustrating another form of the present invention with internally located conditioning means;

FIGURE 7 is another view similar to FIGURES 5 and 6 and illustrating another form of the invention with internally located conditioning means; and FIGURE 8 is another view similar to FIGURES 5, 6 and 7 illustrating another form of the invention with internally located conditioning means.

Figure 1:
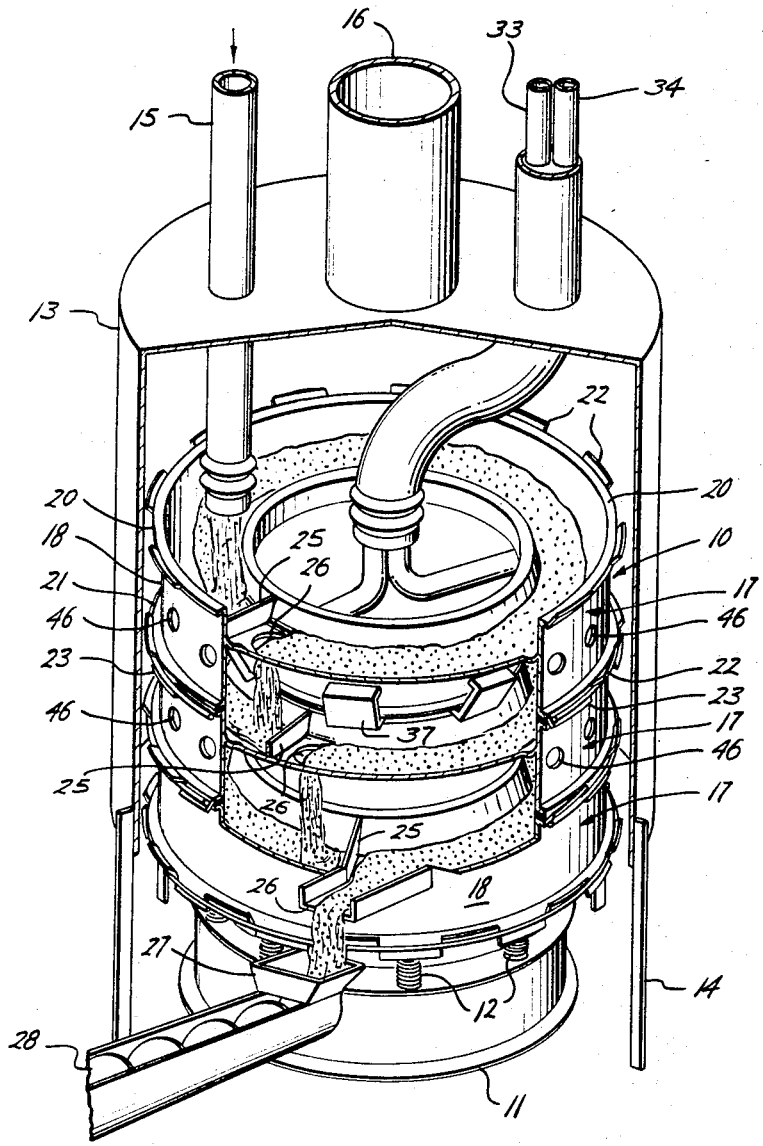
FIGURE 1 is a perspective view of the apparatus of the present invention with a portion of the apparatus broken away to illustrate the interior structure of the apparatus.

Referring more in detail to the drawing, the apparatus of the present invention illustrated in FIGURE 1 includes a tray assembly 10 mounted on a base 11 by resilient mounting means 12, such as springs. Shroud 13 surrounds the upper portion of tray assembly 10 and is supported by legs 14. Inlet 15 extends through the top of shroud 13 and discharges onto the uppermost tray of tray assembly 10, as hereinafter more fully explained. Vent 16 extends through the upper portion of shroud 13 to provide an exhaust for the interior of shroud 13. Shroud 13 may also be insulated to limit heat transfer to and from tray assembly 10. As shown, shroud 13 provides means for thermally and acoustically insulating the device and also will control the spreading of light-weight solid particles, such as dust, from the immediate vicinity of the device.

Tray assembly 10 is composed of a plurality of tray sections 17 which are mounted one above the other. Each individual tray section comprises an outer cylindrical ring 18 having an annular trough 19 welded or otherwise suitably secured to the interior of the ring 18. Each of the rings 18 is provided with upper and lower outwardly extending flanges 20 and 21, respectively. Ears 22 extend upwardly and outwardly at an angle from and are spaced around the outer periphery of upper flange 20. Ears 23 extend downwardly and outwardly at an angle from and are spaced around the outer periphery of lower flange 21. The spacing between ears 22 and between ears 23 is sufficient so that when tray sections 17 are joined together, each of ears 22 will be positioned between two of ears 23, and each of ears 23 will be positioned between two of ears 22. With the ears 22 and 23 so positioned and with one tray section 17 resting on the top of another tray section 17, the tray sections are secured together by clamping ring 24. Clamping ring 24 is positioned externally of both ears 22 and 23 and urges ears 23 downwardly and the ears 22 upwardly whereby the adjacent tray sections are secured in position. This positioning of clamping ring 24 is clearly shown in FIGURES 2, 3 and 5 through 8.

It is particularly important that adjoining tray sections 17 be securely clamped together so that the vibrations imparted to tray assembly 10 will be transmitted to each tray section 17 without dampening. Thus, the structure of ears 22 and 23 and clamping ring 24 will secure adjoining tray sections 17 against relative movement with respect to each other whereby the controlled vibrations will be imparted to each tray section 17 of tray assembly 10. Ears 22 and 23 will also assist in the correct orientation of tray sections in relation to adjoining tray sections.

Annular trough 19 is provided with a baffle 25. Assuming the movement of solids of annular trough 19 to be clockwise when viewed in plan view, the inlet to each such trough is shown to be that portion immediately clockwise of the baffle and an outlet 26 is positioned in that area immediately counterclockwise from the baffle 25 for the maximum travel of solids on trough 19. With the baffle 25 positioned between the inlet to and the outlet from a trough, the solids discharged onto a trough 19 will travel in an arcuate path slightly less than 360° from the inlet position substantially around the entire trough and will be discharged from the trough through the outlet 26. A shorter path of travel of the solids may be achieved by rotating the trays to position the outlet 26 from one tray at the desired angular position in relation to the outlet from the next lower tray. In this manner, the length of each arcuate path through which the solids travel can be shortened from a maximum travel of slightly less than 360° to any desired minimum travel or to bypass a tray completely by positioning one outlet immediately above the outlet on the next lower tray which is to be by-passed. Thus each tray may be positioned over another tray in any of a plurality of positions dependent only upon the proper positioning of the ears 22 and 23 for clamping by the clamping ring 24. In the lowest tray section 17 of tray assembly 10, the outlet 26 extends to a position external of the ring 18 and discharges into the hopper 27 of an auger conveyer 28. On other trays the outlet 26 provided is merely a hole in the lower portion of annular trough 19 which is positioned directly above the inlet area of the next lower tray section 17.

The controlled vibrations imparted to the apparatus of the present invention result from the motor 29 which is secured to the lower portion of tray assembly 10 by the brackets 30. Such vibrations result from the eccentrically mounted weights 31 and 32 secured to the shaft of motor 29 above and below motor 29. The details of motor mounting can be seen in FIGURE 2. Such controlled vibrations resulting from the above-described structure are clearly explained by G. H. Meinzer in U.S. Patent No. 2,284,671 dated June 2, 1942.

The controlled vibrations resulting from the rotation of weights 31 and 32 will cause each of the solids to travel in a generally rolling annular path around the tray sections. Such movement of the solids includes the contact of individual solid bodies with each other and with the troughs 19. This movement will greatly assist in the conditioning of the solids.

In the apparatus illustrated in FIGURE 1, the conditioning means illustrated would be the air and fuel conducted through lines 33 and 34, respectively, into manifolds 35 and 36 which connect to the burners 37, as clearly shown in FIGURE 4.

As shown in FIGURE 2, tray assembly 10 is provided with bottom 38 to which the brackets 30, supporting the motor 29, are secured and a cover 39. Both bottom 38 and cover 39 are provided with ears similar to the ears 22 and 23 and a suitable clamping ring secures bottom 38 to tray assembly 10 and another clamping ring secures cover 39 to the top of tray assembly 10.

Flexible connection 40 connects from inlet 15 to cover 39 and is provided to absorb the vibrations of the tray assembly 10 so that the vibrations will not be transmitted from cover 39 to inlet 15. Similarly, flexible connection 40a connects to cover 39 and is provided to protect lines 33 and 34 from the vibrations of the tray assembly 10 and to conduct exhaust gases therefrom.

The device illustrated in FIGURE 2 may be operated under pressures above atmospheric conditions. Provision should be made for such pressure operations for a valve controlled vent outlet, a valve controlled solids inlet and a rotary air lock valve on the solids outlet. Such devices are not illustrated but are well known and may readily be incorporated in the device of the present invention for pressure operations.

Between tray sections 17 a suitable gasketing 41, as hereinafter more fully described, is provided. As shown in FIGURE 3, clamping ring 24 is provided with suitable adjustable tightening means 42 which, as shown, comprises the respective flanges 43 on the ends of clamping ring 24 joined by bolt 44 and tightened by the nut 45.

Referring to FIGURE 1, it should be noted that the rings 18 are provided with ports 46 below trough 19 for the ventilation of the interior of the tray assembly 10. Ports 46 allow the direct escape of the combustion gases and any other gases from the tray assembly 10, and such gases will be exhausted from under shroud 13 through the vent 16. Obviously, when the device of the present invention is to operate at pressures above atmospheric pressure, rings 18 will not include such ports 46.

In FIGURE 5 the burner 47 is illustrated as being on the exterior of tray assembly 10 and applying heat to the exterior of ring 18 whereby the solids contained within the annular trough 19 may be conditioned by such heat. Also shown in FIGURE 5, gasketing 41 includes a gasketing ring 48 being substantially rigid and resilient gasketing material 49 surrounding the outer tapering surfaces of the ring 48.

In FIGURE 6 heat exchange tubing 50 is illustrated providing the means of conditioning the solids on the annular trough 19. Such tubing 50 is positioned immediately below the annular trough 19. Also in FIGURE 6, the gasketing 41 is shown to include the ring 51 and resilient gasketing material 52. It should be noticed that ring 51 differs from ring 48 in that it does not taper outwardly, but is substantially flat throughout the major portion of its cross-sectional radial dimension.

As shown in FIGURE 7, spray nozzle 53 is positioned within ring 18 immediately above annular tough 19. Also, in FIGURE 7 gasketing 41 includes an annular H-shaped ring 54 and flat gaskets 55 and 56 for engaging the lower surface of flange 21 and the upper surface of flange 20, respectively. Further it should be noted that clamping ring 24, as illustrated in FIGURE 7, is made from a resilient material.

In FIGURE 8 it should be noted that tubing 57 is positioned within and immediately above annular trough 19 to provide heat or other conditioning of solids on trough 19. It should be further noted with regard to FIGURE 8 that adjacent rings 18 are not provided with the flanges 20 and 21, but are merely provided with the ears 58 and 59, similar to ears 22 and 23, extending from the upper and lower ends of rings 18, respectively. Clamping ring 60, similar to clamping ring 24, engages within the outer angle between the ears 58 and 59 to secure the adjacent sections of ring 18 together forming the tray assembly 10.

In operation the device of the present invention will be started by commencing the operation of the conditioning means, as, for example, conducting air and fuel through the lines 33 and 34 to the burners 37 and igniting the burners, by starting the rotation of the weights 31 and 32 by energizing the motor 29 to achieve the desired rotational speed and by feeding the solids onto the uppermost trough 19 through the inlet line 15. It should be noted that, while not shown, the solids conducted to the device of the present invention through line 15 should be at a controlled rate so that the flow of solids through the device will be a smooth, even and continuous flow. This may readily be accomplished by feeding the solids to the line 15 with an auger (not shown) and controlling the speed of the auger to deliver solids to the line 15 at the desired rate.

With the solids moving through the device of the present invention and the conditioning means in operation, the solids on the uppermost trough 19 will be subject to an indirect conditioning or pre-conditioning, assuming that the conditioning being accomplished is that of heating the solids. The burners 37 being below the upper trough 19 will cause the trough 19 to be heated and such heat will be transferred to the solids on the upper trough 19. The solids will travel clockwise around the upper trough 19 in a fluidized state caused by the controlled vibrations and will be discharged therefrom through the outlet 26 onto the intermediate trough 19 at the inlet position of the intermediate trough 19 immediately clockwise of the baffle 25. Solids moving around on the intermediate trough 19 will be exposed directly to the heat from the burners 37. It should be understood that if extended time for conditioning is desired, several intermediate tray sections 17, with each tray section including a conditioning means such as burners 37, may be installed between the upper and lower tray sections 17. With such additional intermediate tray sections, the residence time of the solids in the direct conditioning zone may be greatly extended without affecting the output rate of conditioned solids from the device. Also, an additional tray may be so oriented with respect to the other trays to provide another horizontal arcuate path of travel for the solids of any desired length as hereinbefore explained. The lower tray section, as illustrated in FIGURES 1 and 2, may have conditioning means (not shown), such as burner 37, or may be used for post conditioning; e.g., to allow the solids which have been conditioned by heat to at least partially cool before discharge. It should be noted that while the tray assemblies 10, illustrated in FIGURES 1 and 2, are shown with three tray sections 17, any number of tray sections may be used to form an assembly so long as sufficient residence time in the conditioning zone is provided for the particular conditioning to be accomplished.

The output of the device of the present invention will be determined by the size of the annular troughs 19 used and by the rate of movement of the solids around each trough from its inlet to its outlet responsive to the controlled vibrations. These controlled vibrations should be controlled whereby the solids on each trough 19 will receive the maximum amount of motion during their travel while maintaining the solids under control in the trough.

Further the controlled vibrations must not be severe to the extent that they cause excess attrition of the solid particles. Some attrition of solids may be acceptable for certain applications but care should be taken to balance the advantage of greater vibration against any disadvantage, such as attrition resulting therefrom.

In many types of solid conditioning to which the present invention has application, it is necessary to construct all portions of the device which are exposed to the solids of a material, such as stainless steel, which will not react with or in any way contaminate the solids moving through the apparatus.

It should be noted that the interior of tray assembly 10, particularly at the joints between sections, presents a substantially smooth surface which will prevent the collection of solid. In food conditioning collection of solids, if allowed, would eventually lead to contamination or spoilage of the cooked product. Collection of particles is effectively prevented by the smooth interior of tray assembly 10. It is further preferred in applications, particularly pressure applications, that the adjoining tray sections be adequately sealed with suitable gasketing 41 and such gasketing be of a material which will not contaminate the solids being conditioned. Also, the gasketing, such as the resilient gasketing materials 49, 52, 55 and 56, is preferred to be made from a resilient material but such material should have sufficient rigidity when compressed by adjacent tray sections 17 clamped together to transmit the controlled vibrations throughout the whole tray assembly 10. The clamping system, illustrated in FIGURE 8, is generally preferred to be used only in processes for conditioning solids when the conditioning pressure is atmospheric pressure.

As shown in the drawing, thermal conditioning may be carried out in any one of the several ways illustrated. Direct fired thermal conditioning is illustrated in FIGURES 1 and 2. FIGURE 5 illustrates an indirect-type of thermal conditioning which may be used when it is necessary to protect the solids being conditioned from direct heating or from the products of combustion. In FIGURES 6 and 8 two forms of indirect heating are illustrated wherein a conditioning means comprises the heat exchange tubing 50 and 57. In FIGURE 6 the heat is exchanged to the under portion of the trough 19 immediately above the tubing 50 and solids thereon are thereby thermally conditioned. In FIGURE 8 tubing 57 is positioned immediately above the trough 19 and thermal conditioning of the solids thereon will be by a direct heat exchange with the walls of tubing 57. In both forms the tubing will normally contain some medium, usually a liquid, having a temperature substantially different from the temperature of the solids to be conditioned and such temperature difference will allow heat exchange from the medium through the wall of the tubing to the solids. The solids may be conditioned by flowing a hot gas into the conditioner and allowing the hot gas to flow over the solids on each tray and be discharged through the ports 46 in the rings 18.

In the form of the invention illustrated in FIGURE 7, the spray nozzle 53 is positioned directly over trough 19 and may be used for introducing a liquid or gaseous conditioning medium in any suitable form into the solids circulating on trough 19. Examples of uses of a spray nozzle in conditioning solids are to spray a liquid onto the solids whereby the solids are coated by the liquid, to introduce liquid drops into the moving solids whereby portions of the solids will agglomerate with each drop forming pellets of the solid material, or to introduce a liquid or gaseous material which is to come into intimate contact with the moving solids to modify or react with the solids.

It should be noted that the size of the individual solid particles to be conditioned by the process and apparatus of the present invention would normally be limited only by the particle size necessary for the conditioning. The particle sizes should not be so large that they cannot be accommodated by the physical dimensions of the device or the available power to produce the desired controlled vibrations. Materials, such as coffee, nuts, cotton seeds, clay, carbon, shale, shell, fertilizers, minerals, meat, vegetables and ores are examples of materials which may be conditioned by the present invention.

The conditioning means for the present invention may readily be some means other than the means illustrated. Thermal conditioning means may be electric coils, infrared lamps, cooling coils or other means which will thermally condition the solids on the troughs 19.

The forms of conditioning which may be accomplished by the present invention are numerous and limited only to such conditioning as may be accomplished within the tray assembly 10. Examples of the wide variety of conditioning of solids which may be accomplished are: cooking, calcining, drying, cooling, coating, pelletizing, retorting, quenching, carbonizing, glazing, fumigating, and others.

It can be seen from the foregoing that the present invention provides a novel process and apparatus for continuously conditioning solids by subjecting the solids to controlled vibrations as they are being conditioned. The present invention also may be operated continuously under pressure and is sufficiently adaptable to allow changes in exposure time of the solids to the conditioning means without changing the output of the device. In addition novel structure has been provided for securing a plurality of trays into a tray assembly with joints which are easily and quickly assembled and disassembled, and to allow relative rotation of the trays to preselect the length of the path of travel on each tray and therefore the time during which the solids are exposed to conditioning on the trays.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:

1. A process for continuously conditioning solids, comprising
continuously feeding solids to a conditioning zone,
conditioning said solids in said conditioning zone,
imparting controlled vibrations to said solids to move said solids in sequence downward through a series of vertically spaced, horizontal, arcuate paths of travel in said conditioning zone and to fluidize said solids for exposure of all of said solids to said conditioning,
discharging the conditioned solids from said conditioning zone, and
positioning the inlet and outlet of said arcuate paths to preselect the length of travel of solids in each of said arcuate paths to thereby preselect the time of exposure of said solids to said conditioning.

2. A process according to claim 1, wherein said conditioning includes
introducing a conditioning medium into said conditioning zone to heat said solids in their movement through said conditioning zone.

3. A process according to claim 2, wherein
said conditioning medium is a gaseous fluid.

4. A process according to claim 3, wherein
said gaseous fluid is introduced into said conditioning zone under pressure.

5. A process according to claim 2, including the steps of
flowing a portion of said conditioning medium across at least one of said arcuate paths of travel of said solids to condition the solids traveling thereon, and
venting the conditioning medium from said conditioning zone after it flows across one of said arcuate paths.

6. An apparatus for conditioning solids, comprising
a plurality of annular trays,
means connecting said plurality of trays in vertical spaced relationship with each of said trays being positioned substantially horizontal,
an inlet to feed solids to be conditioned onto the upper annular tray,
an outlet from each of said trays to direct all of the solids onto the next lower tray,
the outlet from the lowest tray being the outlet from said apparatus to discharge conditioned solids therefrom,
the position of said inlet and the outlet of each tray with respect to the outlet from the next lower tray being adjustable to preselect the length of the path of travel of solids on each tray,
vibrating means to impart controlled vibrations to said trays to move solids in an arcuate path on each of said trays to the outlet of the tray and to fluidize the solids being moved along the arcuate path on each of said trays, and
means for conditioning the solids on said trays.

7. An apparatus according to claim 6, wherein
the solids travel in an arcuate path on each of said trays less than 360°.

8. An apparatus according to claim 6, wherein said conditioning means includes
means for conducting a heated gas into contact with the solids on said trays.

9. An apparatus according to claim 6, including
a plurality of rings,
one of said rings being connected to and surrounding each of said trays,
each of said rings defining a plurality of holes below the tray to which it is connected for venting the space between its tray and the next lower tray.

10. An apparatus according to claim 9, including
a shroud spaced from and extending around and over said plurality of trays, and
a vent in said shroud above said trays,
the lower edge of said shroud being open to provide circulation of air around said trays and out said vent to conduct vented conditioning medium from said trays through said vent.

11. An apparatus according to claim 6, wherein said connecting means includes a ring connected to and surrounding each of said trays and being a portion of said connecting means, the upper edge of each of said rings having a plurality of spaced-apart, upwardly and outwardly extending ears, the lower edge of each of said rings having a plurality of spaced-apart, downwardly and outwardly extending ears adapted to be positioned between and angularly disposed with respect to the ears on the upper edge of the next lower ring, and a clamp ring surrounding and engaging the ears of adjoining rings to secure said rings together.

12. An apparatus according to claim 6, wherein said conditioning means includes conditioning apparatus positioned between two of said trays, means supporting said conditioning apparatus independent of said trays and said vibrating means to insulate said conditioning apparatus from vibrations thereof.

13. An apparatus according to claim 6, including a cover secured over the upper tray, said inlet extending through said cover, a bottom secured under the lower tray, said connecting means forming a sealed structure with said cover and said bottom, means for introducing a thermal conditioning medium into said sealed structure, and means for discharging said thermal conditioning medium from said structure after the solids on said trays have been exposed to said conditioning medium.

14. An apparatus according to claim 13, including an annular gasket positioned between adjoining edges of said rings, said annular gasket including an annular gasket ring, and resilient material positioned between said gasket ring and said tray rings, the inner surface of said annular gasket being flush with the inner surface of said tray rings.

15. An apparatus according to claim 14, wherein said gasket ring is tapered toward its outer edge.

References Cited

UNITED STATES PATENTS

| | | | |
|---|---|---|---|
| 2,284,671 | 6/1942 | Meinzer | 209—325 |
| 2,498,405 | 2/1950 | Fader. | |
| 2,860,598 | 11/1958 | Loesche | 34—178 X |
| 2,946,429 | 7/1960 | Carrier | 34—147 X |
| 3,010,802 | 11/1961 | Schenk et al. | 34—164 X |
| 3,035,700 | 5/1962 | McCausland | 209—332 X |
| 3,084,450 | 4/1963 | Hansen | 34—164 |
| 3,217,864 | 11/1965 | Allen et al. | 198—220 |

FOREIGN PATENTS 884,559  12/1961  Great Britain.

WALTER A. SCHEEL, *Primary Examiner.*

J. M. BELL, *Assistant Examiner.*